US005546544A

United States Patent [19]
Dike et al.

[11] Patent Number: 5,546,544
[45] Date of Patent: Aug. 13, 1996

[54] ARBITER WITH A DIRECT SIGNAL PATH THAT IS MODIFIABLE UNDER PRIORITY-CONFLICT CONTROL

[75] Inventors: Charles E. Dike, Pleasant Grove; Farrell L. Ostler, Provo, both of Utah

[73] Assignee: North American Philips Corporation, New York, N.Y.

[21] Appl. No.: 342,685

[22] Filed: Nov. 21, 1994

Related U.S. Application Data

[63] Continuation of Ser. No. 117,966, Sep. 7, 1993, abandoned, which is a continuation of Ser. No. 804,254, Dec. 4, 1991, abandoned.

[51] Int. Cl.$^6$ ...................................................... G06F 13/00
[52] U.S. Cl. .................. 395/287; 395/732; 364/DIG. 1; 364/240; 364/242.6; 364/242.8
[58] Field of Search ..................................... 395/325, 425, 395/725, 275, 287, 293, 856, 860, 728, 729, 732; 340/825.510, 825.5

[56]  References Cited

U.S. PATENT DOCUMENTS

| | | | |
|---|---|---|---|
| 4,016,539 | 4/1977 | Nanya | 340/147 LP |
| 4,035,780 | 7/1977 | Kristick et al. | 395/725 |
| 4,402,040 | 8/1983 | Evett | 395/325 |
| 4,449,183 | 5/1984 | Flahive et al. | 395/325 |
| 4,482,954 | 11/1984 | Vrielink et al. | 395/725 |
| 4,511,959 | 4/1985 | Nicolas et al. | 395/325 |
| 4,612,542 | 9/1986 | Pantry et al. | 340/825.5 |
| 4,630,041 | 12/1986 | Casamatta et al. | 340/825.5 |
| 4,835,422 | 5/1989 | Dike et al. | 307/518 |
| 4,835,672 | 5/1989 | Zenk et al. | 395/425 |
| 4,837,682 | 6/1989 | Culler | 395/325 |
| 4,841,178 | 6/1989 | Bisson | 307/518 |
| 4,851,996 | 7/1989 | Boioli et al. | 395/550 |
| 4,872,004 | 10/1989 | Bahnick et al. | 340/825.5 |
| 4,881,195 | 11/1989 | DeLong et al. | 395/725 |
| 4,933,901 | 6/1990 | Tai et al. | 365/189.07 |
| 4,962,379 | 10/1990 | Yasuda et al. | 340/825.510 |
| 5,218,703 | 6/1993 | Fleck et al. | 395/725 |
| 5,230,054 | 7/1993 | Tamura | 395/725 |
| 5,274,822 | 12/1993 | Stanton et al. | 395/725 |

*Primary Examiner*—Ayaz R. Sheikh
*Attorney, Agent, or Firm*—Steven R. Biren

[57]  ABSTRACT

An arbiter provides at an output a priority signal that indicates which one of the input signals at an input has gained priority over all other ones. The arbiter comprises a signal processing path between the input and the output for determining the priority signal. The arbiter further comprises a control means coupled to the signal path for detecting (rare) conflicts among priority candidates. In response to the detected conflict, the control means generates control signals to modify the signal path. This conflict-solving part of the arbiter is located outside the signal path. Accordingly, a signal propagation delay in the path is largely independent of the number of input signals.

7 Claims, 4 Drawing Sheets

ARBITER WITH A DIRECT SIGNAL PATH THAT IS MODIFIABLE UNDER PRIORITY-CONFLICT CONTROL

This is a continuation of application Ser. No. 08/117,966, filed Sep. 7, 1993, which is a continuation of application Ser. No. 07/804,254, filed Dec. 4, 1991, both now abandoned.

FIELD OF THE INVENTION

This invention relates to an arbiter for providing at an arbiter output an absolute priority signal associated with a particular one of a plurality of input signals received at an arbiter input. The invention relates in particular to an asynchronous arbiter.

BACKGROUND ART

An arbiter is a well known interface circuit that controls a communication protocol on the basis of assigning priority to a particular input signal selected from a plurality of input signals in order to determine a processing sequence for the input signals. The priority assignment may be based on temporal aspects of the signals, e.g., the order of arrivals at the arbiter's inputs. Assigning a priority to the particular input signal is then to be understood as selecting the particular input signal on the basis of its temporal characteristics with respect to the temporal characteristics of the other input signals: e.g., the particular input signal is the first to have arrived and determines the further processing. Typically, arbiters are used for controlling the communication between transmitting stations and receiving stations interconnected via a bus system.

U.S. Pat. No. 4,835,422 issued to Dike et al. discusses an electronic arbiter circuit with an input section that provides relative priority signals upon receiving a plurality of input signals. Each respective relative priority signal specifies which one of a respective pair of input signals has gained priority over the other input signal. The relative priority signals associated with all pairs of input signals are supplied to a decode logic circuit. The decode logic circuit operates on the relative priority signals in order to furnish output signals specifying an absolute priority of a particular one of the input signals. That is, the output signals indicate which one of the input signals is considered to have gained priority over all other input signals.

In addition, the decode logic circuit takes care of priority conflicts that may occur at the level of the relative priority signals. A priority conflict is an event wherein, for example, three or more input signals arrive substantially simultaneously within the resolution of the electronics and the delay paths involved. Such an event gives rise to inconsistences. For example, the relative priority signals may indicate that the respective input signals at first, second and third input terminals respectively gained priority over the input signals at the second, third and first input terminals. Assuming that one of these input signals indeed was the first to arrive overall, such a cyclic relationship does not give an unambiguous absolute priority winner. The decode logic circuit is designed to resolve the conflict by selecting in a predetermined manner one of the input signals, which was involved in causing the conflict, as the absolute priority winner.

In the known arbiter, the signal path is from the inputs of the input section through the decode logic circuit to the circuit's outputs. The decode logic circuit itself comprises arrangements of several logic AND gates that receive particular combinations of the relative priority signals to be fed into a single logic OR gate. The size of each AND gate and each OR gate grows with the number of relative priority signals to be processed. For a 4-input arbiter, for instance, four arrangements of three 3-input AND gates with outputs coupled to a 3-input OR gate each are required. A 6-input arbiter designed on the basis of the same philosophy would need four arrangements with twelve 5-input AND gates and a 12-input OR gate each, and two arrangements with eleven 5-input AND gates and an eleven-input OR gate each.

Beyond a certain number of N inputs, it becomes impractical or impossible to use a single logic N-input gate, owing to, for instance, transistor characteristics related to threshold voltages and saturation phenomena. Instead, a combination of logic gates, each with a lower number of inputs, is employed to perform the same logic function. This, however, introduces additional cumulative gate delays. Accordingly, the arbiter's speed decreases as the number of input signals increases. As an illustration, a prior art 4-input arbiter has a typical signal propagation delay of 7 nsec. A 6-input arbiter fabricated in the same technology would have a typical propagation delay of 9 nsec, whereas the propagation delay in a 16-input arbiter typically would be 14 nsec.

The majority of the events to be evaluated by an arbitrary arbiter does not entail priority conflicts. Since in the prior art the single signal path always leads through the conflict-resolving decode logic, unnecessary signal propagation delays are inflicted upon the majority of the priority cases to be examined. The cumulative effect of the delays becomes more pronounced with an increasing number of input signals to be processed due to the increased number of combined logic gates, as explained above.

Another undesirable aspect of the architecture of the prior art arbiter is that the output signals, which are indicative of the absolute priority of a particular input signal, may change if one or more input signals, other than the particular input signal, switch. Both switching of an input signal with a lower priority and the operation of the decode logic will resolve a priority conflict. Switching of a lower priority signal may change the status of the decode logic and, therefore, the output signals.

OBJECTS OF THE INVENTION

It is an object of the invention to provide an arbiter whose speed is largely independent of the number of input signals to be processed. It is another object to furnish an arbiter wherein the absolute priority of a particular input signal does not change as a result of switching one of the other input signals.

SUMMARY OF THE INVENTION

To this end, the invention provides an arbiter for providing at an arbiter output an absolute priority signal associated with a particular one of a plurality of input signals at an arbiter input gaining priority over all other input signals. The arbiter comprises a signal processing path between the arbiter input and the arbiter output for determining the absolute priority signal on the basis of the input signals. The arbiter further comprises control means coupled to the signal path for detecting a priority conflict and for thereupon generating control signals for modifying the signal path in order to resolve the conflict.

The invention provides an architecture wherein the conflict-resolving circuitry is located outside the main signal path that couples the input to the output. The control means interferes with the priority assignment process only in case of an occasional conflict. The control means comprises the conflict-resolving but delay-generating devices. As a result, the delay in the signal path is largely independent of the number of input signals to be processed.

In contrast with the prior art, switching of one or more of the input signals, other than the particular one to which the absolute priority is assigned, does not change the absolute priority, once it is established. If a conflict did occur prior to switching, it was resolved by modifying the signal path. An unambiguous priority state is the steady result. Switching one or more of the lower priority input signals does not change the absolute priority at the arbiter's output. Since the signal path's state has been adapted to the absolute priority of a particular input signal, this state is not altered when changes occur at the lower priority level(s).

BRIEF DESCRIPTION OF THE DRAWING

The invention will be explained by way of example and with reference to the accompanying drawing, wherein.

DETAILED EMBODIMENTS

PRIOR ART ARBITER

Figure 1:
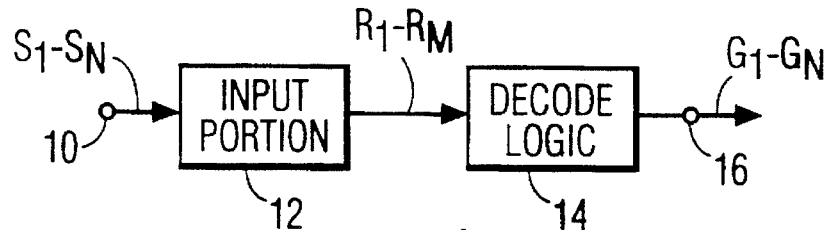
FIG. 1 shows a schematic example of a known arbiter.

FIG. 1 shows a known arbiter. The arbiter includes an input 10 for receiving input signals $S_1$–$S_N$, an input portion 12 for correlating pairs of input signals $S_i$,$S_j$ ($i \neq j$) in order to generate relative priority signals $R_1$–$R_M$, wherein M equals $N(N-1)/2$. Each one of the relative priority signals $R_1$–$R_M$ indicates which one of the input signals of the associated pair has gained priority over the other one. The arbiter further includes a decode logic section 14 for providing absolute priority signals $G_1$–$G_N$ at an output 16. Absolute priority signals $G_1$–$G_N$ specify which one of input signals $S_1$–$S_N$ has gained priority over all other ones.

Decode logic section 14 resolves the priority conflicts (see above) that may arise when, for instance, input portion supplies contradictory relative priority signals $R_1$–$R_M$ or when three or more of the input signals $S_1$–$S_N$ arrive substantially simultaneously. In case of such a conflict, decode logic section 14 settles into an unambiguous state and provides predetermined and unique absolute priority signals $G_1$–$G_N$ at output 16.

Decode logic section 14 generally includes a hierarchy of logic gates whose sizes scale according to the number of relative priority signals $R_1$–$R_M$ to be processed. As a consequence, the delays caused by a succession of logic gates will be more pronounced when the number of relative priority signals $R_1$–$R_M$ to be processed is increased.

FIRST SCHEMATIC EXAMPLE OF AN ARBITER ACCORDING TO THE INVENTION

Figure 2:
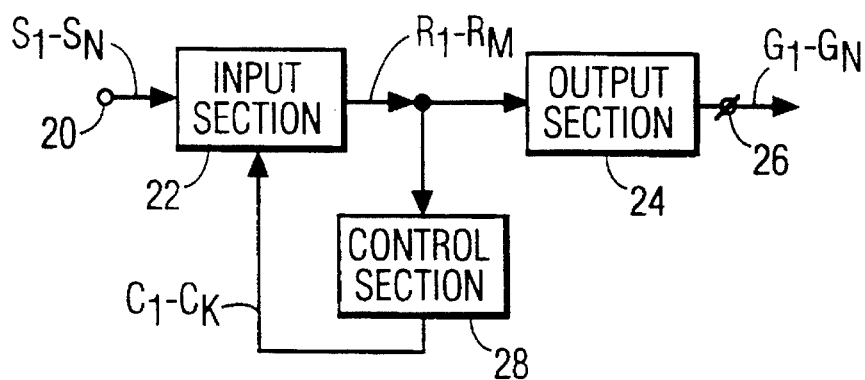
FIG. 2 shows a first schematic example of an arbiter according to the invention.

FIG. 2 shows a first example of the arbiter in accordance with the invention. The arbiter includes input terminals 20 for receiving input signals $S_1$–$S_N$, and an input section 22 for generating relative priority signals $R_1$–$R_M$. Relative priority signals $R_1$–$R_M$ each specify a relative priority within a respective subset (e.g. pair or quadruplet) of input signals $S_1$–$S_N$. That is, each particular relative priority signal indicates which one of the input signals within a particular subset has gained priority over the other input signals in the same subset. The arbiter has an output section 24 that furnishes absolute priority signals $G_1$–$G_N$ at an output 26 in response to relative priority signals $R_1$–$R_M$.

The signal processing from input 20 via input section 22 through output section 24 to output 26 constitutes a direct signal path. Using the same technology as for the known arbiter mentioned in the background art section above, a typical value of the signal propagation delay in the direct path of the arbiter in the invention is 5.5 nsec.

The arbiter comprises a control section 28 that receives relative priority signals $R_1$–$R_M$ and provides control signals $C_1$–$C_K$ to input section 22 in the event of a priority conflict. Control signals $C_1$–$C_K$ resolve the conflict by forcing input section 22 to supply conflict-free relative priority signals $R_1$–$R_M$. The processing of input signals $S_1$–$S_N$ via control section 28 constitutes a second signal path.

Control section 28 solves the priority conflict by modifying the direct signal path. As mentioned above, the second signal path is only used occasionally. Since control section 28 constitutes additional circuitry, it is therefore in general advantageous to keep this circuitry out of the direct path. It is in control section 28 that gate delays become noticeable when the number of relative priority signals $R_1$–$R_M$ to be processed is increased.

SECOND SCHEMATIC EXAMPLE OF AN ARBITER ACCORDING TO THE INVENTION

Figure 3:
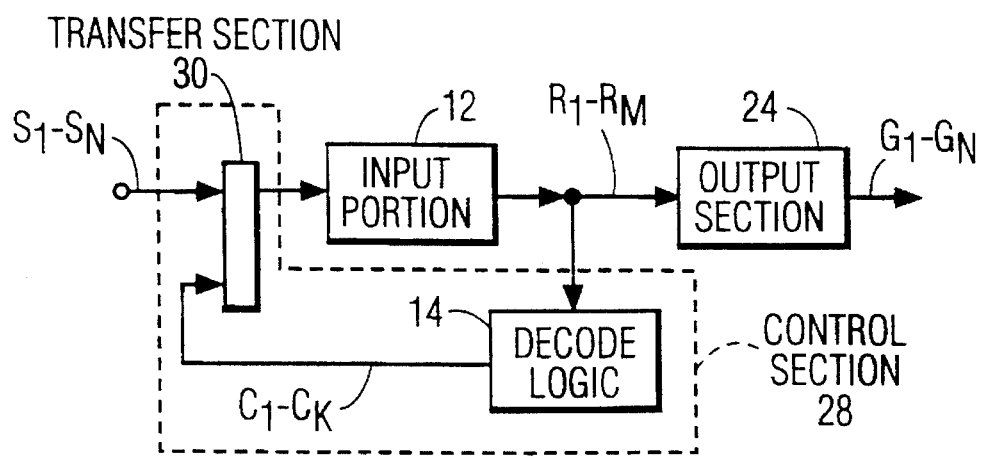
FIG. 3 shows a second schematic example of an arbiter according to the invention.

FIG. 3 shows a second example of an arbiter in the invention, using the functional arrangement of FIG. 2 and parts similar to those of the prior art arbiter in FIG. 1. In FIG. 3, input portion 12 and decode logic section 14 together form a known arbiter embedded in the architecture of the invention. Decode logic section 14 takes care of occasional priority conflicts in the usual way. However, control signals $C_1$–$C_K$ from decode logic section 14 are supplied to a transfer section 30. Transfer section 30 controls the routing of input signals $S_1$–$S_N$ to input portion 12 in response to control signals $C_1$–$C_K$ in case of a priority conflict. In a conflict situation, transfer section 30 supplies to input portion 12 a combination of control signals $C_1$–$C_K$ and input signals $S_1$–$S_N$ that removes the conflict and creates unambiguous absolute priority signals $G_1$–$G_N$. If there is no conflict, control signals $C_1$–$C_K$ do not interfere with input signals $S_1$–$S_N$ propagating from input 20 to input portion 12. That is, transfer section 30 is maintained transparent to input signals $S_1$–$S_N$.

FIRST DETAILED EMBODIMENT

Figure 4:
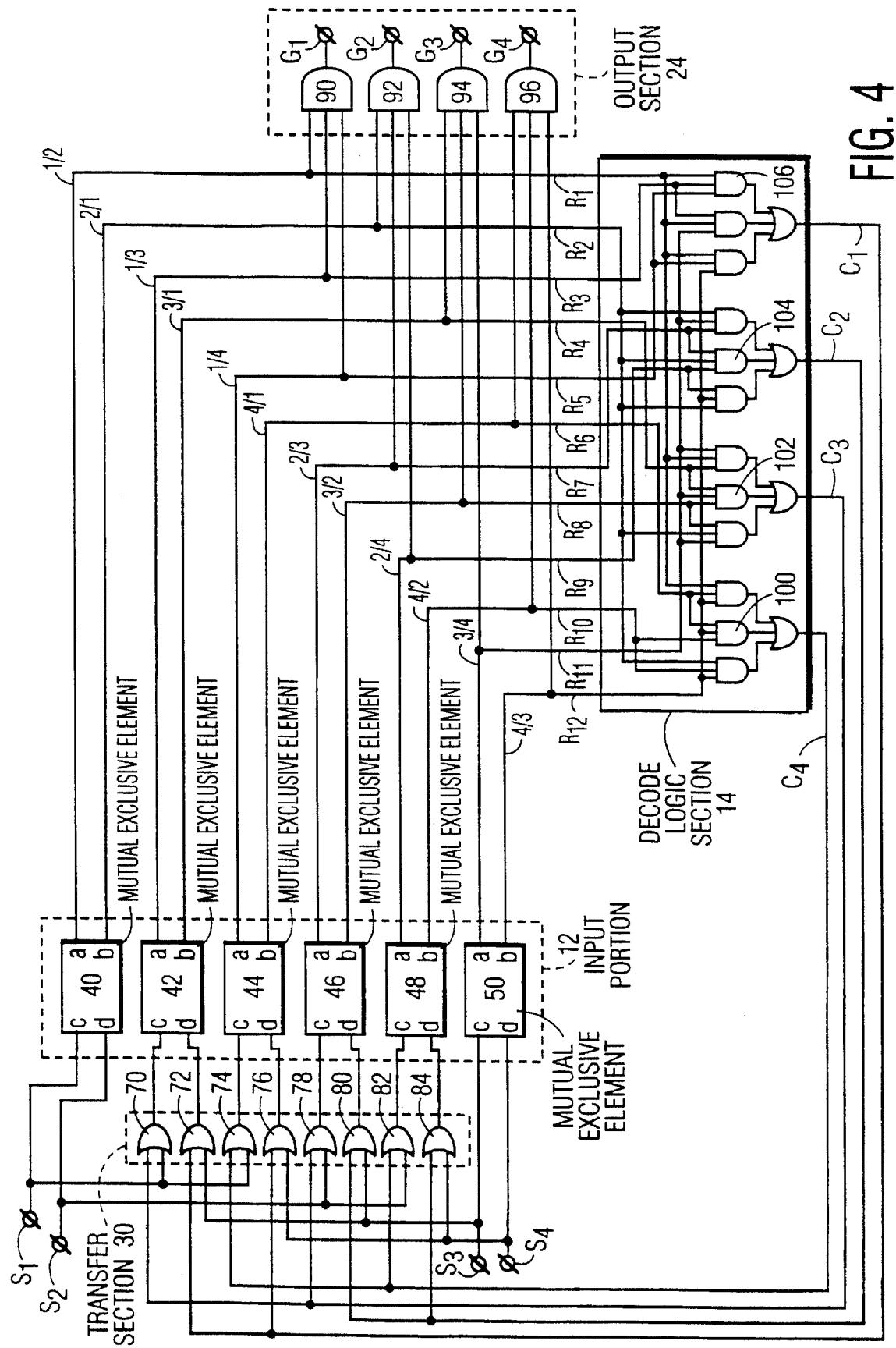
FIG. 4 shows a first detailed example of an arbiter in the invention.

FIG. 4 gives a first detailed version of a 4-input arbiter according to the invention. The architecture of FIG. 3 is used. Input portion 12 comprises six mutual-exclusive elements 40–50 for evaluating particular pairs of input signals $S_1$, $S_2$, $S_3$ and $S_4$ to generate relative priority signals $R_1$–$R_{12}$. Relative priority signals $R_1$–$R_{12}$ are supplied to inputs of decode logic section 14.

For a discussion on decode logic section 14, see U.S. Pat. No. 4,835,422, mentioned above, which is incorporated herein by reference. Note that decode logic section 14 is a combinatorial arrangement of logic gates. That is, control signals $C_1$–$C_4$ provided by decode logic section 14 are determined by the momentary values of relative priority signals $R_1$–$R_{12}$. For ease of understanding, the leads between element 40, which receives input signals $S_1$ and $S_2$, and decode logic section 14 are denoted by ½ and ⅔, indicating the connections for relative priority signals $R_1$: "$S_1$ beats $S_2$" and $R_2$: "$S_2$ beats $S_1$", respectively. Similar notations are used for the leads between the other elements 42–50 and decode logic section 14.

Decode logic section 14 provides transfer section 30 with control signals $C_1$–$C_4$ that specify a conflict-free overall (absolute) priority situation. Transfer section 30 includes logic OR gates 70–84 that transfer input signals $S_1$, $S_2$, $S_3$ and $S_4$ to mutual-exclusive elements 42–48 in response to control signals $C_1$–$C_4$. Elements 40–50 are directly connected to output section 24. Output section 24 comprises four logic AND gates 90–96 for supplying absolute priority signals $G_1$–$G_4$. Each of AND gates 90–96 has inputs connected to selected ones of outputs a and b of mutual-exclusive elements 40–50.

Each of mutual exclusive elements 40–50 includes a sequential logic circuit. That is, each of elements 40–50 furnishes output signals that depend on both the momentary and previous values of the signals received by the element. In this example, the design of each of element 40–50 is such that both element outputs a and b provide a logic LOW when the signals at element inputs c and d both are HIGH. If the signal at input c goes LOW first, output a provides a HIGH and output b provides a LOW, and vice versa if input d goes LOW first. In case the signal at the other input (d or c, respectively) thereupon goes LOW as well, the signals at outputs a and b do not change.

Operation of the arbiter is as follows. Assume that input signals $S_1$, $S_2$, $S_3$ and $S_4$ initially all are HIGH. Consequently, elements 40–50 carry a LOW at both outputs a and b, and AND gates 90–96 supply LOW output signals $G_1$–$G_4$. Decode logic section 14 provides LOWs to OR gates 70–84 in transfer section 30, rendering these gates transparent to signals $S_1$, $S_2$, $S_3$ and $S_4$.

Assume that signal $S_1$ is the first one to go LOW. Input signal $S_1$ then is to gain priority over signals $S_2$, $S_3$ and $S_4$. Outputs a of elements 40, 42 and 44 all supply a HIGH, all other element outputs providing a LOW. Accordingly, absolute priority signal $G_1$ is HIGH and absolute priority signals $G_2$–$G_4$ are LOW, indicating input signal $S_1$'s absolute priority. Control signals $C_1$, $C_2$, $C_3$ and $C_4$ are HIGH, LOW, LOW and LOW, respectively, and control OR gates 70–84 in such a way that OR gates 72 and 76 supply a HIGH to elements 42 and 44, respectively, regardless of the further behavior of input signals $S_3$ and $S_4$. The other OR gates 70, 74 and 78–84 each receive a LOW from decode logic section 14 and are transparent to input signals $S_2$, $S_3$ and $S_4$.

If one or more of input signals $S_2$, $S_3$ and $S_4$ later changes from HIGH to LOW, the output of associated elements 46–50 will change accordingly. However, owing to the particular combinations of logic signals supplied to AND gates 90–96 and decode logic section 14, absolute priority signals $G_1$–$G_4$ and control signals $C_1$–$C_4$ will not change their status.

The arbiter's operation under priority conflict conditions will now be discussed with reference to an example. Assume that the following event has occurred: $S_1$ beats $S_2$, $S_2$ beats $S_3$, $S_3$ beats $S_4$, $S_4$ beats $S_1$, $S_1$ beats $S_3$, and $S_4$ beats $S_2$. This represents an inconsistent priority situation that may have arisen owing to, for instance, simultaneous arrivals within the resolution of the circuitry and delay paths involved. This particular signal combination generates the following relative priority signals: logic HIGHs on the leads indicated by: ½, ⅔, ¾, ⁴⁄₁, ⅓ and ⁴⁄₂ and logic LOWs on the other leads. Note that absolute priority signals $G_1$–$G_4$ all are LOW and that no absolute priority is indicated. Note also that input signals $S_1$–$S_4$ all have gone LOW.

As can readily be deduced, decode logic section 14 develops the following values for control signals $C_1$–$C_4$: $C_1$ is HIGH, and $C_2$–$C_4$ all are LOW. Control signals $C_1$–$C_4$ are applied to OR gates 70–84 in transfer section 30. OR gates 72 and 76 both receive a HIGH from decode logic section 14. Accordingly, both input d of element 42 and input d of element 44 receive a HIGH, and both input c of element 42 and input c of element 44 receive a LOW. Element 42 does not change its output signals, but element 44 is forced to accept a new state, wherein output a is HIGH and output b is LOW. As a result, lead ¼ now is HIGH and lead ⁴⁄₁ is low. Decode logic section 14 retains its state, but output section 24 now provides absolute priority signals $G_1$–$G_4$ indicative of the priority assigned to $S_1$, i.e., $G_1$ is HIGH and $G_2$–$G_4$ all are LOW.

The partitioning of the architecture into a direct signal path from input portion to output section 24 and a control path through decode logic section 14 preferably is used to optimize the components in the direct path with regard to speed. The components in the control path, particularly decode logic section 14, preferably are optimized with regard to power consumption and, in an integrated circuit embodiment, with regard to substrate area.

Note that the arrangement of input portion 12 and decode logic section 14 forms a prior art arbiter. Decode logic section 14 as represented in FIG. 4 is the same as used in a 4-input arbiter of the prior art. The shown architecture thus permits usage of known and available building blocks.

Note also that, in the invention, AND gates 100–106 of decode logic section 14 may be left out since they do not contribute to the resolving of priority conflicts. For a prior art decode section with more than four inputs, removal of some of the logic gates from the decode logic section will affect the operation of the conflict-solving part and is therefore not recommended.

SECOND DETAILED EMBODIMENT

Figure 5:
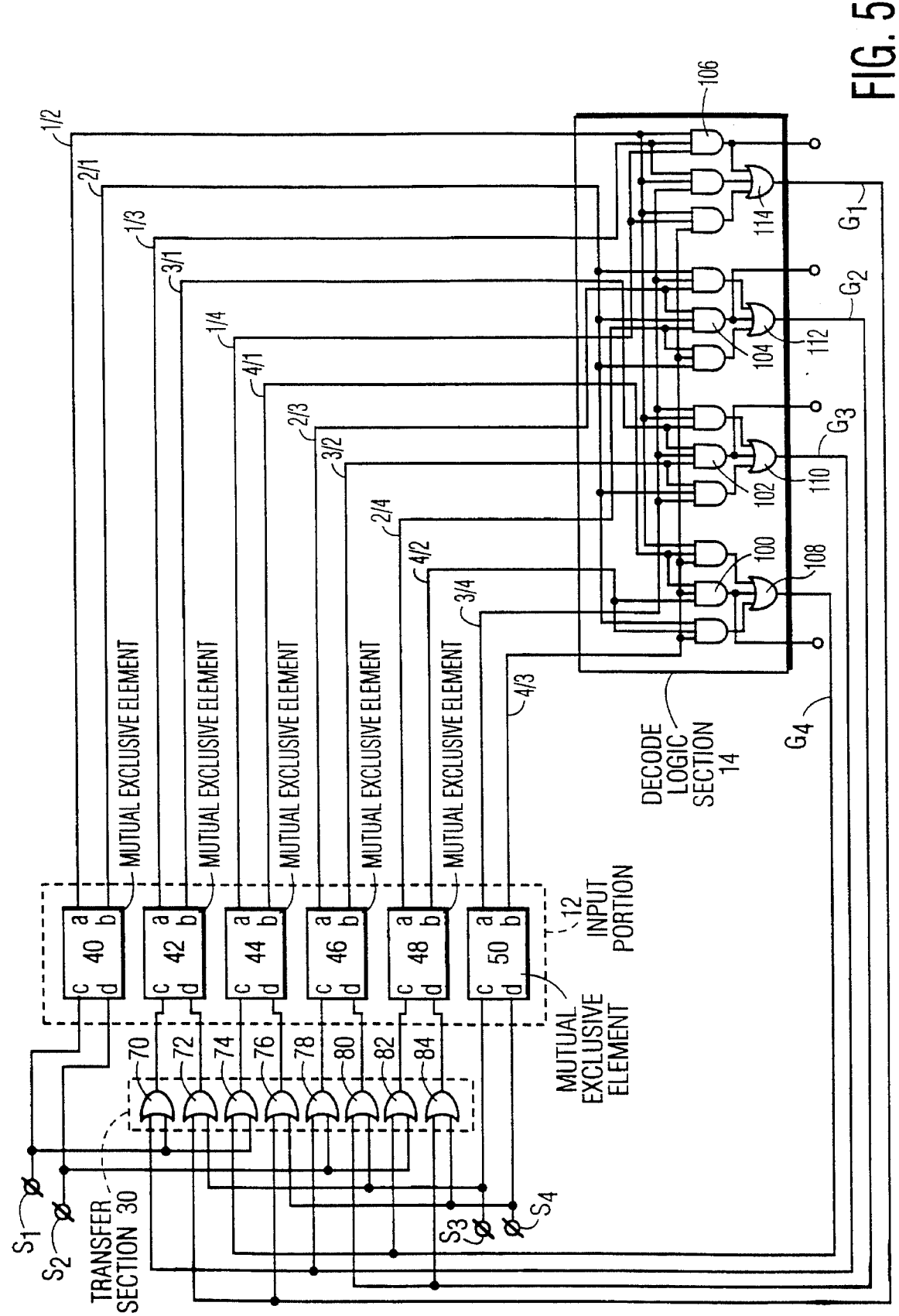
FIG. 5 shows a second detailed example of an arbiter in the invention.

FIG. 5 shows a second example of an arbiter according to the invention. The only difference from the arbiter of FIG. 4 is that output section 24 of FIG. 4 now has been merged with decode logic section 14. Since the logic operation in each of AND gates 100–106 is performed on the same combinations of relative priority signals $R_1$–$R_{12}$ as in AND gates 90–96 of FIG. 4, absolute priority signals $G_1$–$G_4$ are available at the respective outputs of AND gates 100–106.

Again, note that AND gates 100–106 do not contribute to the resolution of a priority conflict. Therefore, the connection between AND gates 100–106 and respective OR gates 108–114 may be deleted. Note also that, again, input section 12 and decode logic section 14, as drawn, together form a known arbiter. Operation of the arbiter is likewise identical to that of FIG. 4.

THIRD SCHEMATIC EXAMPLE

Figure 6:
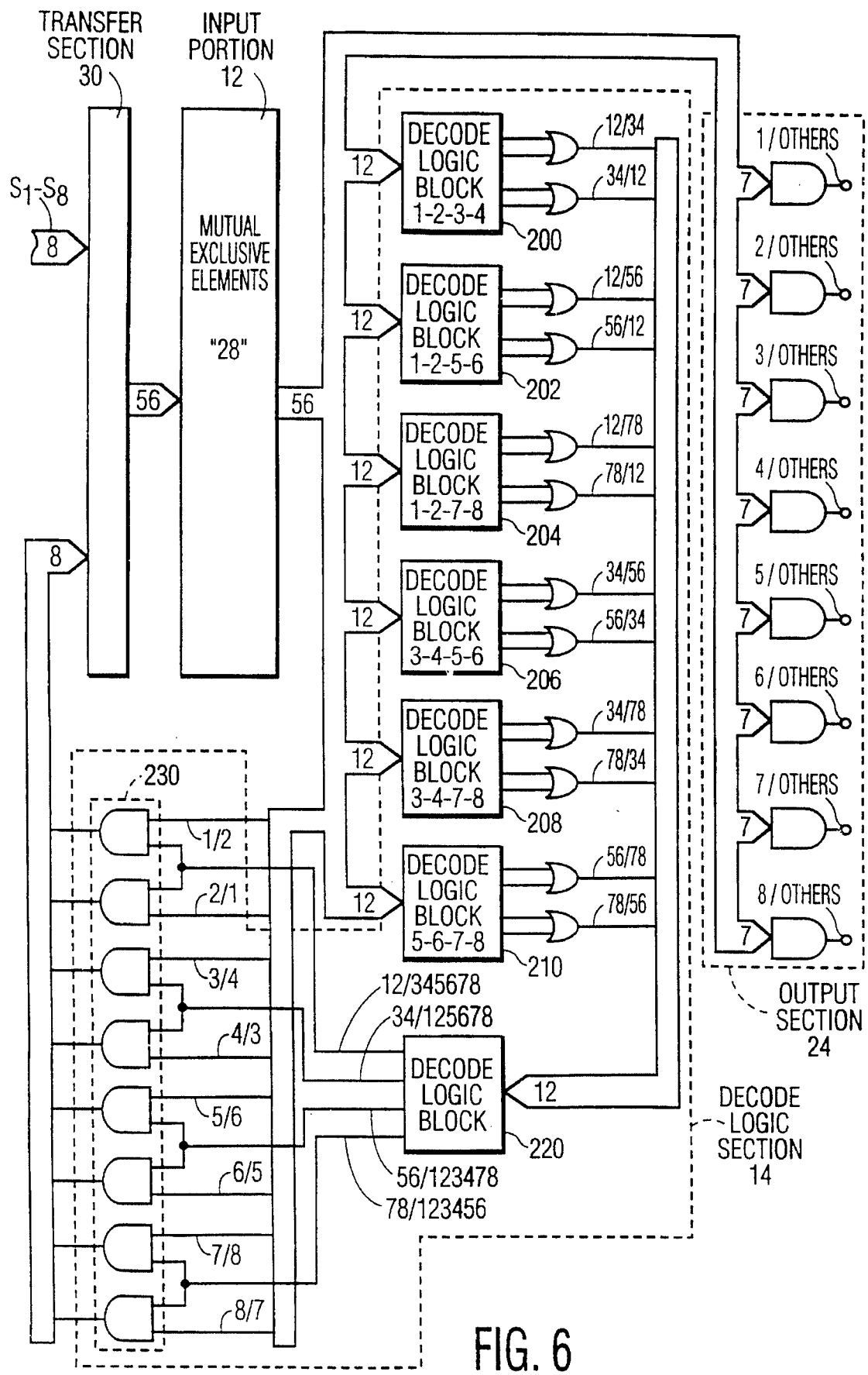
FIG. 6 shows a third schematic example of an arbiter in the invention.

FIG. 6 shows a third schematic example of an arbiter in accordance with the invention. The shown device is an 8-input arbiter for determining the absolute priority for input signals $S_1$–$S_8$. The architecture follows the general concept of FIG. 3 and need not be explained in further detail. Decode logic section 14 now has a particular structure based on partitioning of the decode circuitry into uniform decode logic blocks 200–210 and 220.

Eight input signals $S_1$–$S_8$ give rise to fifty-six relative priority signals $R_1$–$R_{56}$ provided by twenty-eight mutual exclusive elements of input portion 12 and designated by the reference numeral 56 at the output of input portion 12, similar to the operation in the arbiter of FIG. 4. Each one of the relative priority signals $R_1$–$R_{56}$ specifies the relative priority of one of the input signals $S_1$–$S_8$ over another. Relative priority signals $R_1$–$R_{56}$ are arranged in six groups of twelve (designated by the numbers 12 in FIG. 6) relative priority signals each. Each respective one of decode logic blocks 200–220 receives a respective group of relative priority signals, now for determining a relative priority status within a respective quadruplet of input signals $S_1$–$S_8$.

More particularly, relative priority signals $R_1$–$R_{56}$ are divided into six groups relating to the priority statuses internal to the following quadruplets of input signals $S_1$–$S_8$: $[S_1$–$S_2$–$S_3$–$S_4]$, $[S_1$–$S_2$–$S_5$–$S_6]$, $[S_1$–$S_2$–$S_7$–$S_8]$, $[S_3$–$S_4$–$S_5$–$S_6]$, $[S_3$–$S_4$–$S_7$–$S_8]$ and $[S_5$–$S_6$–$S_7$–$S_8]$. Each respective group of relative priority signals is applied to a respective one of decode logic blocks 200–210. Each of decode logic blocks 200–210 thereupon supplies further relative priority signals, now specifying the further relative priority status within the associated quadruplet of input signals.

Next, the further relative priority signals, supplied by decode logic blocks 200–210, are logically paired by logic OR gates which are identified by reference numerals which identify their respective output signals (i.e., $^{12}/_{78}$ or $^{78}/_{12}$, as explained below), and which furnish output signals indicating in which pair of further relative priority signals there is an input signal that has priority over the input signals of the other pair within the same group.

For instance, the pairs related to group $[S_3$–$S_4$–$S_7$–$S_8]$ are $[S_3$–$S_4]$ and $[S_7$–$S_8]$. By means of the logic OR gates output signals are generated that indicate in which pair there is an input signal that has priority over the input signals of the other pairs in the same group. In FIG. 6, the respective OR gates are referred to by way of their respective output signals. OR gates $^{12}/_{78}$ and $^{78}/_{12}$, for instance, supply output signals, expressing that the relative priority within group $[S_1$–$S_2$–$S_7$–$S_8]$ is either in pair $S_1/S_2$ or in pair $S_7/S_8$.

Next, the groups are correlated to one another by routing the output signals of the logic OR gates to another decode logic block 220. Block 220 furnishes output signals that specify which one of all pairs is associated with the particular input signal that has the absolute priority. For example, lead 56/123478 is active, if the absolute priority should be assigned to either $S_5$ or $S_6$.

Finally, a logic AND operation performed in logic AND gate arrangement 230 on the output signals of block 220 and output signals of input portion 12 representing a priority in each of the pairs, delivers the absolute priority signals. These priority signals thereupon are applied to transfer section 30.

The partitioning architecture has the advantage that any number of input signals can be dealt with by means of a hierarchical arrangement of layers with uniform decode blocks 200–220. An example of a circuit to be used as a decode block is decode section 14 in FIG. 4. The decode section's 14 design is simplified considerably in this way.

It will be clear to the person skilled in the art that the above partitioning approach can also be used in the decode logic 14 of a conventional arbiter according to FIG. 1.

The above diagrams are given by way of example. Depending on the particular technology used to implement the arbiter of the invention (e.g., completely integrated circuit or discrete electronic parts), on the logic signal levels chosen or on transitions LOW-HIGH instead of HIGH-LOW as indications of signal arrivals, or depending on other relevant criteria, the person skilled in the art will readily recognize opportunities to employ different logic gates or to merge, partially or entirely, logic gates with one another, that have been drawn separately in the figures. Above drawings are preferably to be interpreted functionally.

We claim:

1. An arbiter having:

an arbiter input for receiving a plurality of input signals;

an arbiter output for providing an absolute priority signal associated with a particular one of the plurality of input signals, the particular one of the input signals gaining priority over all other ones among the input signals;

a single main signal processing path between the arbiter input and the arbiter output operative to directly determine the absolute priority signal in the absence of a conflict stemming from contesting ones among the input signals; and control means outside the main path and coupled to the main path for, upon detecting the conflict, modifying the main path in order to resolve the conflict and to enable the main path to determine the absolute priority signal, said control means being operative to modify the main path by generating control signals for, upon logic combination with the input signals, forcing the main path into a conflict-free state.

2. The arbiter of claim 1 wherein the main signal processing path comprises:

an input section connected to the arbiter input for receiving the input signals and for providing respective relative priority signals that each are indicative of a respective relative priority of a particular input signal within a respective subset of the input signals;

an output section coupled between the input section and the arbiter output for providing the absolute priority signal on the basis of the relative priority signals; and wherein the control means comprises:

a conflict-solving section having inputs connected between the input section and the output section for generating a control signal upon receiving the relative priority signals indicative of the conflict, and having outputs coupled to the input section for controlling the input section through the control signal.

3. The arbiter of claim 2 wherein the conflict-resolving section comprises a control section for receiving the relative priority signals and generating the control signal, and a transfer section for combining the control signal and the input signals prior to input to the input section.

4. The arbiter of claim 3 wherein the control section includes combining means for combining the relative priority signals to generate the control signal.

5. The arbiter of claim 3 wherein the input section and the control section together functionally include another arbiter for generating the control signals.

6. The arbiter of claim 3 wherein:

the input section comprises mutual-exclusive elements, each respective mutual-exclusive element providing the respective relative priority signal that specifies which one of a respective pair of input signals has gained priority over the other input signal;

the output section comprises combination logic gates, each respective combination gate receiving the relative priority signals associated with ordered pairs of the input signals that have a respective input signal in common;

the transfer section comprises transfer logic gates each for transferring the respective input signal to a particular mutual-exclusive element upon receiving a respective enabling signal from the control section; and wherein the input section and the control section together include another arbiter.

7. The arbiter of claim 6 wherein the combination logic gates are functional parts of the control section.

* * * * *